April 21, 1970  AKIHIKO SATO  3,507,199
DAMPING MEANS FOR VIEWING MIRROR
Filed June 21, 1967
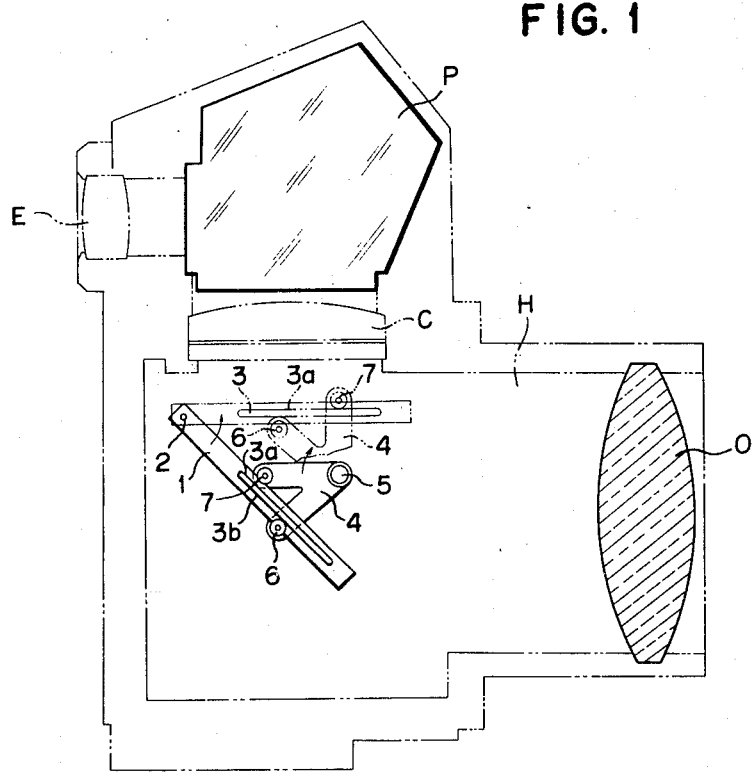
FIG. 1
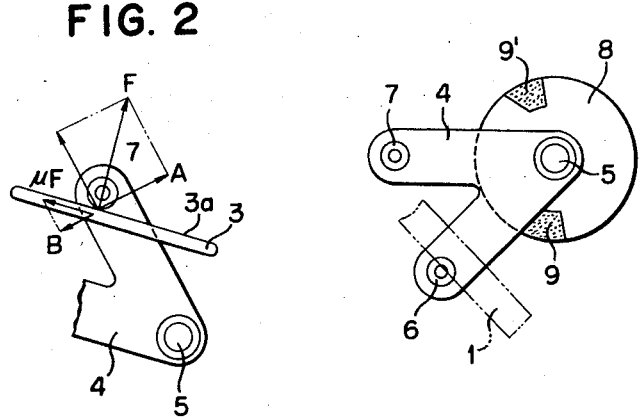
FIG. 2
FIG. 3

United States Patent Office 3,507,199
Patented Apr. 21, 1970

3,507,199
DAMPING MEANS FOR VIEWING MIRROR
Akihiko Sato, Tokyo, Japan, assignor to Nippon Kogaku K.K., Tokyo, Japan, a corporation of Japan
Filed June 21, 1967, Ser. No. 647,703
Int. Cl. G03b 19/12
U.S. Cl. 95—42       2 Claims

ABSTRACT OF THE DISCLOSURE

A damping device for a single lens reflex camera employing a dead center lever arranged to lessen the shock of impact when the mirror is raised from, or lowered to, its viewing position. The device also serves as limit stops for the mirror in its extreme positions.

---

The present invention relates to damping means for a movable reflecting mirror in a single lens reflex camera.

A single lens reflex camera having a quick return mechanism for the viewing mirror operable on release of the shutter mechanism, is subject to the shock of impact and noise generated at the time when the mirror is moved to its extreme position. This is a major distraction to the camera user and the jarring effect of camera impact is sometimes sufficient to move the camera the instant the shutter is released.

The object of the present invention is to soften the impact shock of the mirror, at the same time eliminating the noise; and for setting up the predetermined elevated and lowered positions of the reflecting mirror.

The present invention will be described with reference to the embodiment shown in the attached drawing, in which:

FIG. 1 shows a single lens reflex camera in phantom line provided with a damping means embodying the present invention; the elements of the damping means being shown in elevation;

FIG. 2 is a force diagram of the damping means; and

FIG. 3 is a fragmentary elevational view of the invention with a friction plate cooperating with one of the levers thereof.

In the drawing, 1 is a movable reflecting mirror supported by shaft 2 mounted in the camera housing H of a single lens reflex camera. The camera is provided with a penta prism P, a condenser lens C, an objective O and an eye-piece E in the usual manner. The reflecting mirror 1 is rotated upwardly to the position shown by the dotted line in FIG. 1 or downwardly to the position shown by the solid line in FIG. 1. The release and return mechanism for the viewing mirror is not illustrated since such mechanisms are well known in the art and forms no part of the present invention. The reflecting mirror is provided on one side with a projecting slide or camming member 3, of which the upper 3a and lower 3b surfaces form smooth slide surfaces, respectively. A bellcrank member 4 is fixed on a shaft 5, said shaft being rotatably mounted in fixed on the camera housing H. On the end portions of the respective arms comprising the member 4, pins or rollers 6 and 7 are respectively provided. One of the pins 6 engages the lower slide surface 3b of the slide member 3 and it is so devised that when the reflecting mirror 1 is at the lowest or viewing position, i.e. the position shown by the solid line in FIG. 1, the pin 6 is in a "dead-center" position against said slide surface 3b, that is, where a line drawn through the centers of the shaft 5 and the pin 6 is normal to the slide surface 3b. The other pin 7 engages the upper slide surface 3a and it is so devised that when the reflecting mirror 1 is at the highest position, i.e. the elevated position shown by the dotted line in FIG. 1, the pin 7 is in a "dead-center" position against the slide surface 3a.

It may be mentioned that the operation can be carried out more smoothly if a small gap exists between pin 6 or 7 and slide surface 3b or 3a when pin 7 or 6 engages the slide surface 3a or 3b.

When the reflecting mirror 1 is elevated from its viewing position, the upper surface 3a of the slide member 3 is engaged by the pin 7 to rotate the bellcrank member 4 in the clockwise direction. At the elevated position of the mirror, the upper surface 3a of the member 3 and the pin 7 are in the relation of dead center and as the pin 7 closes in to this position, the rotational force A of the member 4 (refer to FIG. 2) is gradually reduced, and at the final position, A becomes equal to O, and therefore the reflecting mirror comes to stop quietly. As is shown in FIG. 2, with the force F applied to the pin 7, the component B of the friction $\mu F$ works against the pin 7 and the slide surface 3a tending to reduce the force in the direction of A. In particular as the reflecting mirror 1 nears its upper position, the force A is reduced abruptly, and therefore the effect of B becomes greater. This prevents the rotation of the member 4 to a certain degree and has the effect of braking the movement of the reflecting mirror 1.

When the reflecting mirror 1 is lowered, the lower surface 3b of the slide projection 3 pushes down the pin 6, and the lowest position (the lowered position), the pin 6 and the slide member 3 are in the relation of dead center, causing the mirror to stop. In this case too, the effect as mentioned above is obtained, and the reflecting mirror 1 stops at its viewing position without any shock. Therefore, no unpleasant vibration or no shocking noise of the mirror will be produced.

In addition to the above, in order to make the braking more effective, it is possible to frictionally control the rotation of the bellcrank member 4. As is shown in FIG. 3, a control plate 8 is rotatably mounted on the shaft 5, and a plate spring or the like may be interposed between the plate and member 4. At the same time two projections 9, 9' are provided on plate 8 at appropriate positions within a more or less reduced arcuate section which is shorter than the range of the rotation of the member 4 so that frictional forces are applied only in the neighborhood of the termination of the rotation of the member 4.

The present invention may be employed independently of any system setting up the viewing position of the reflecting mirror. With the position of the pin 6 at dead center as in the given embodiment, the pin 6 forms a stop for the mirror in its viewing position, without noise or shock with the arrangement described.

It will be apparent from the foregoing that with the present invention it is possible to prevent the shock and the noise of the mirror generated at the time when the reflecting mirror is elevated or lowered, the arrangement being such that the position setting operation of the miror may be carried out simultaneously without interference or binding of the mirror setting and return mechanism.

What is claimed is:

1. Damping means for the viewing mirror of a single lens reflex camera rockable between a viewing position and an exposure position, comprising a camming member fixed to the mirror for movement therewith, and having two parallel slide surfaces thereon, a lever pivoted in the camera body within the range of movement of the mirror, said lever having two pins thereon angularly spaced from each other with respect to the pivot of the lever, each pin being adapted to engage a slide surface on the camming member and to slide to a dead center position on their respective slide surfaces to gradually reduce the rotational force of the mirror by the friction between the projections and their respective slide surfaces, when one pin reaches its dead center position on its slide surface, the other pin is out of both dead center positions.

2. Damping means according to claim 1, wherein a braking plate is frictionally rotatable about the pivot point of the lever, and two projections on said disc are spaced within the range of movement of the lever for rotating said disc by said lever only in the vicinity of the termination of the rotation thereof for braking the lever in its viewing and exposure positions.

References Cited
UNITED STATES PATENTS

| | | | |
|---|---|---|---|
| 3,020,815 | 2/1962 | Landbrecht | 95—42 |
| 3,075,443 | 1/1963 | Reiche | 95—42 |
| 3,083,627 | 4/1963 | Naumann et al. | 95—42 |
| 3,257,922 | 6/1966 | Maitani | 95—42 |

NORTON ANSHER, Primary Examiner

R. L. MOSES, Assistant Examiner